United States Patent [19]
Bennett

[11] Patent Number: 5,908,584
[45] Date of Patent: Jun. 1, 1999

[54] ELECTRICALLY CONDUCTIVE BUILDING MATERIAL

[75] Inventor: Ronald Wilfred Murdoch Bennett, Nyon, Switzerland

[73] Assignee: Elfinco S.A., Fribourg, Switzerland

[21] Appl. No.: 08/750,734

[22] PCT Filed: Jun. 19, 1995

[86] PCT No.: PCT/EP95/02373

§ 371 Date: Feb. 25, 1997

§ 102(e) Date: Feb. 25, 1997

[87] PCT Pub. No.: WO96/00197

PCT Pub. Date: Jan. 4, 1996

[30] Foreign Application Priority Data

Jun. 24, 1994 [CH] Switzerland .............................. 2023/94

[51] Int. Cl.$^6$ ................................ H01B 1/18; H01B 1/24; G21F 3/04
[52] U.S. Cl. ............................ 252/502; 252/503; 252/506; 252/511; 428/688; 428/924; 250/515.1; 250/517.1
[58] Field of Search ..................................... 252/502, 503, 252/510, 511, 506; 106/713, 737, 472, 476; 428/688, 924; 52/506.01; 250/515.1, 517.1

[56] References Cited

U.S. PATENT DOCUMENTS

| | | | |
|---|---|---|---|
| 3,301,799 | 1/1967 | Rothberg et al. | 260/17 |
| 3,962,142 | 6/1976 | Freeman et al. | 252/503 |
| 5,004,561 | 4/1991 | Nomura et al. | 252/511 |
| 5,447,564 | 9/1995 | Xie et al. | 106/644 |

FOREIGN PATENT DOCUMENTS

| | | |
|---|---|---|
| 0 032 375 | 7/1981 | European Pat. Off. . |
| 2 216 244 | 8/1974 | France . |
| 2 596 403 | 10/1987 | France . |
| 61-188472 | 8/1986 | Japan . |
| 1126248 | 5/1989 | Japan . |
| 1 424 162 | 2/1976 | United Kingdom . |

OTHER PUBLICATIONS

Pat. Abs. of Japan, vol. 012 No. 482 (Asahi Chem Res Lab Ltd), JP 63–196672 Aug. 15, 1988.

Primary Examiner—Mark Kopec
Attorney, Agent, or Firm—Kane, Dalsimer, Sullivan, Kurucz, Levy, Eisele and Richard, LLP

[57] ABSTRACT

An electrically conductive material used for shielding against electromagnetic waves and comprising a binder, a mixture of graphite and amorphous carbon, and sand. It has been shown that this mixture has enhanced shielding properties, particularly in the 100 MHZ range. The graphite/carbon mixture preferably makes up 25–75% of the total weight of the material. The binder may be cementitious. Said material may also be used in conductive floors, electrical heating equipment, light conductors, heating elements, ground connections, resistors, capacitors and antennas.

17 Claims, No Drawings

ELECTRICALLY CONDUCTIVE BUILDING MATERIAL

FIELD OF THE INVENTION

The present invention concerns an electrically conductive building material.

PRIOR ART

It is known so far to use building materials as electrically conductive shield against electromagnetic radiations. GB patent 1 424 162 discloses electrically conducting coatings based on cement containing dispersed graphite applied on a reinforcing grid for a shield coating which cuts frequencies between 20 KHz to 50 KHz.

In the FR-A-2 216 244 are described coatings based on cement and two dispersed carbons of different granulometry for electrically conductive materials of structure such as grounding connections, antistatic floors and walls cutting radio frequencies.

In the JP-A-63 196 672, one has proposed a component for fabricating electrical resistors and electrical circuits comprising an organic binder, an amorphous carbon, graphite in the form of whiskers and silica.

In the EP-A-032 375, one has described an electrically conductive elastomer comprising a copolyetherester and a mix of carbon and graphite intended for use in electronic equipment and office machines.

However, the attenuation performances of known electrically conductive shields are not linear in a range of frequencies. Some frequency ranges are more important for certain applications than for other, for example a frequency range which is particularly important for safety shielding are the frequencies between 1 MHz to 10 GHz. Nevertheless, the attenuation performances of most materials are relatively weak around 100 MHz. Since the attenuation performance normally presented is a mean value on a large frequency band, the deficiency of attenuation performances in a given particularly important band frequency, for example in the region of 100 MHz is often not apparent.

Carbon is allotropic and is found widely in its elementary crystalline or amorphous solid forms. It is found in coke in an amorphous form and examples crystalline forms are graphite and diamond. In different applications, one has used either amorphous carbon or graphite.

SUMMARY OF THE INVENTION

The aim of the present invention is:
1. to propose an electrically conductive building material for cutting the electromagnetic radiations and TEMPEST (designation used by NATO concerning non-intentional radiations phenomena resulting from communication and data treatment systems) et more particularly in the range of frequencies comprised between 1 MHz and 10 GHz.
2. to propose electrically conductive building material for the construction of antistatic floors, intrusion sensitive barriers, heating elements, grounding elements, large capacitors, antennas.

The material according to the present invention is characterized by the fact that it comprises a mixture of graphite and amorphous carbon and sand and in that the binder comprises polyamide resins or polycarbonate resins and a cement-based material.

The advantage of the material according to the present invention is the fact that the simultaneous use of amorphous carbon and graphite produces an unexpected synergy effect between them which improves the material efficiency.

The examples of binders for the material according to the invention comprise either ordinary Portland cement or pulverized fuel ashes or quick-taking cement or a combination of these elements. The relative ratio of binder, sand and graphite and amorphous carbon in the material affects as much its shielding properties as its physical properties. High concentrations of carbon in the mixture result in a fragile and brittle material which is difficult to work and which necessitates a support, for example taken in sandwich between two plaster sheets. On the other hand, if the ratio of carbon in the mixture is lower than about 20% of the total weight of the material, then the shielding efficacy decreases. The preferred graphite/amorphous carbon ratio with respect to the total weight of the material is between 25% and 75%, and preferably between 35% and 65%.

The percentage of graphite in the mix graphite/amorphous carbon is between 10% and 95% with respect to the weight of this mixture according to the planned use of the material. For example in a material in which graphite represents 10% of the mix graphite/amorphous carbon, a resistivity of about 0.35 Ohms m is obtained. With a percentage of 50%, the resistivity is 0.024 Ohms m whereas with 95%, the resistivity is about 0.005 Ohms m. Thus, the higher the graphite percentage, the higher the required conductivity and the material can be used as an electromagnetic shield against high frequencies. Conversely, a low graphite percentage increases the resistivity which can be useful when the material is to be used as a heating element. A high percentage of amorphous carbon is also useful for reinforcing the material which is necessary for some applications, when the material is subject to high stress, for example when it is used for floor construction. On the other hand, in some applications, for example in alarm systems, the material must be highly conductive and brittle, in this case the maximal percentages of graphite are necessary.

It is also important for the performance of the material that the size of the graphite particles does not exceed 10 $\mu$m and that of the amorphous carbon particles does not exceed 1 mm. It is preferable that the size of the sand particles is superior to that of one or the other of the amorphous carbon or graphite particles. The amorphous carbon present in the material as calcined coke or any ashes containing amorphous carbon resulting from the combustion of an organic component.

The material can be improved by introduction of pentavalent and trivalent substances in different ratios but not exceeding 1% of the total weight of the amorphous carbon. Introduction of these additives is useful for improving the material conductivity by doping the semi-conductors being in the material. Examples of pentavalent substances are among others phosphorus, antimony and arsenic and as trivalent substances gallium and indium.

The material can be completed with other components such as plasticizers, water-repellants such as silicon ether, barium sulfate, zinc and aluminum. The presence of each of said additives can be particularly advantageous if a shield against high frequencies is necessary. For example, barium ferrite is particularly efficient for attenuation of frequencies beyond 5 GHz, aluminum improves structural properties as much as functional properties (material shielding). The adding of water-repellants is particularly efficient when the material is used for making coatings or ceilings.

The invention also concerns a process of fabricating the material according to which a binder or several binders are mixed with a mixture previously prepared and containing all the other components.

Preferably, sand is firstly mixed with graphite only, and the this mixture is mixed with amorphous carbon. It appears that in this way, it can be ensured that the sand particles are effectively covered with the graphite particles before any other mix, which improves the shielding properties of the material.

The aim of the invention, with respect to the attenuation of electromagnetic radiation and in particular against TEMPEST radiations, is achieved by the absorption and reflection phenomena. The attenuation is the sum of the capacity of the material to absorb and reflect signals. This capacity results from the material conductivity as much as from the material permeability and porosity after being mixed with water. Until now, a permeability of 1.26 of the material with respect to copper has been obtained and a resistivity of 0.024 Ohms m. This is obtained in a mix containing no more than 50% of amorphous carbon and graphite with respect to the total weight of the material. Amorphous carbon acts as a semiconductor for increasing the overall conductivity of the material. This effect is then increased by the inclusion of trivalent or pentavalent substances, which are useful for doping the semiconductivity of the amorphous carbon and thus increase its conductivity. The amorphous carbon increases the permeability of the material and improves its structural properties. The inclusion of amorphous carbon improves the efficiency of the material as an electromagnetic shield.

The material according to the invention can be used principally in three ways:

1. as a coating or mortar comprising the material according to the invention with about 5% of water with respect to the total weight of the cement-based components;
2. as a sandwich-shaped construction panel comprising two support sheets, for example plaster, a mix with the building material and water in a proportion of about 5% of water with respect to the total weight of the cement-based components;
3. as a building block comprising the material of the invention also mixed with water in about 5% of the total weight of the material molded in blocks of different sizes, such blocks being subjected to compressive stress when fabricated, which improves conductivity by reducing the porosity.

One or the other of these three forms of material according to the invention can be used in a shielded room or a building against electromagnetic radiations by using the coating on the walls, ceilings, floors inside or outside, or by fixing panels to said elements or by constructing and covering a room or a building with building elements which have to be cemented together by using also the building material.

In order to improve the structural properties and improve the shielding, a grid with holes which are not larger than 12 mm in diameter, can also be used before applying the panel or the coating. For example by fixing a metal grid having holes of 2,5 mm of opening before the application of a coating, one improves the attenuation of about 10 dB for frequencies of about 100 MHz.

The electrically conductive shield, as produced by using the material according to the invention, can be incorporated in the structure of buildings or offices, when it is useful, for example, as a shield for attenuating electromagnetic radiations.

In this manner, computer installations can be protected against external influences associated with TEMPEST phenomenon by obtaining an attenuation of at least 30 dB by reflection and absorption of frequencies in the range from 1 MHz to 10 GHz. Other embodiments of the electrically conductive material, according to the invention allow to use it for the construction of an antistatic floor, light conductors, grounding connections, antennas, resistors, capacitors.

The material according to the invention being electrically conductive, the walls of a room which have been coated with this material are rendered electrically conductive. This can be exploited for realizing a communication or an alarm system. For example, a room can be alarm protected by coating the walls with a plaster using the material according to the invention and by applying a voltage. If the wall treated in this way is broken by intrusion, the changes in the voltage can be detected and used for activating an alarm system. The conductivity of this material allows to use it as an antenna, the coated wall acting as a detector, for example for radio signals. Another application could also be to use this material for building very large capacitors.

In addition, the material according to the invention presents a resistance and if a current flows through a material, its temperature rises so that it can be used as a heating element. The power used for maintaining the heating at a stable level is reduced since the material presents a negative resistance coefficient increasing with the temperature thus allowing to reduce the heating cost.

The material previously described has no magnetic properties since it is not able to retain a charge.

According to another embodiment, one can provide the material with magnetic properties by adding to the binder, sand, the amorphous carbon, the graphite of the magnetic or magnetizable metallic molecules.

Thus, in a work constructed with such a material, the electrical current flows through the material, the charge is retained and when the current supply is stopped, a discharge in the form of an electrical current is produced. In the same way, if the material is introduced in a magnetic field, it charges itself electrically.

According to another embodiment, the magnetic metallic molecules are ferric molecules.

According to still another embodiment, the metallic molecules are magnetic salts with the main advantage that when the material is wet or placed into water, it charges itself up to a certain level, i.e. it behaves like an electrical battery which can be discharged afterwards. When the material dries, the charge decreases down to a certain level.

The magnetic properties of this material allow to attenuate low and high frequencies. An interesting application of such shield is the fact that the low frequency electromagnetic fields generated, for example, by high voltage energy transfer cables can be attenuated. This application is important since it has been discovered that such magnetic fields are harmful for human health.

The substantial increase of the electrical charge, when this material is wet, allows the user to use the material as a protection membrane on the outside of a container containing dangerous chemical products since a leak can be detected very quickly by an increase of the electrical charge which is permanently measured by an adequate system.

An other application of such material could be the detection of dangerous cracks or fractures in the walls of underwater tunnels or hydroelectric dams, or bridges.

What is claimed is:

1. Electrically conductive building material comprising at least one binder, wherein said material comprises a mixture of graphite particles having a particle size not greater than about 10 microns, amorphous carbon, and sand wherein the binder comprises at least one of the substances selected from the group consisting of a polyamide resin, a polycarbonate resin, and a cement-based material.

2. Electrically conductive building material according to claim 1, wherein the weight of the mixture of graphite and amorphous carbon represents between 25% and 75% of the total weight of the material.

3. Electrically conductive building material according to claim 1, wherein the weight of graphite comprises between 10% and 95% of the weight of the mixture of graphite and amorphous carbon.

4. Electrically conductive building material according to claim 1, wherein the weight of sand represents 20% to 50% of the weight of the mixture of sand and binder.

5. Electrically conductive building material according to claim 1, wherein the amorphous carbon comprises at least one of the substances selected from the group consisting of calcined coke and ashes containing amorphous carbon produced by combustion of an organic component.

6. Electrically conductive building material according to claim 1, wherein said material further comprises at least one of the substances selected from the group consisting of trivalent and pentavalent substances in a maximal proportion of 1% of the total weight of amorphous carbon.

7. Electrically conductive building material according to claim 1, wherein the size of the amorphous carbon particles is smaller than 1 mm, whereas the sand particles are of a larger size than the graphite particles, or than the amorphous carbon particles.

8. Electrically conductive building material according to claim 1, wherein the material comprises water representing about 50% of the total weight of the cement-based materials.

9. A construction panel comprising the material according to claim 8 sandwich formed between two support sheets.

10. A construction block, formed by molding the material of claim 8 wherein said block is compressed for improving the conductivity by reducing its porosity.

11. Process for producing the material according to claim 1, characterized by the fact that the binder or the several binders is introduced in the mix after the other components have been mixed.

12. Process for producing the material according to claim 1, wherein the sand is firstly mixed with graphite to form a graphite/sand mixture and then mixed with amorphous carbon and the possible trivalent and pentavalent substances.

13. A method of electroconductively shielding a building against electromagnetic radiations by placing a shield between the exterior of the building and the source of electromagnetic radiations, said shield selected from the group consisting of the material according to claim 8; the construction panel according to claim 9 and the construction block according to claim 10.

14. The method according to claim 13, characterized by the fact that said shield further comprises a metal grid with a mesh size not larger than 12 mm.

15. Electrically conductive building material according to claim 1, wherein the material further comprises magnetic or magnetizable metallic molecules.

16. Electrically conductive building material according to claim 15 wherein said molecules are ferrous molecules.

17. Electrically conductive building material according to claim 15 wherein said molecules are magnetic salts.

\* \* \* \* \*